(12) United States Patent
Kassa et al.

(10) Patent No.: US 10,706,079 B2
(45) Date of Patent: Jul. 7, 2020

(54) GROUP CLUSTERING USING INTER-GROUP DISSIMILARITIES

(71) Applicant: VMware, Inc., Palo Alto, CA (US)

(72) Inventors: Debessay Fesehaye Kassa, Mountain View, CA (US); Lenin Singaravelu, Sunnyvale, CA (US); Xiaobo Huang, Palo Alto, CA (US); Amitabha Banerjee, Belmont, CA (US); Ruijin Zhou, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 166 days.

(21) Appl. No.: 15/877,977

(22) Filed: Jan. 23, 2018

(65) Prior Publication Data
US 2019/0228097 A1   Jul. 25, 2019

(51) Int. Cl.
*G06F 16/28* (2019.01)
*G06F 11/30* (2006.01)
(Continued)

(52) U.S. Cl.
CPC ........ *G06F 16/285* (2019.01); *G06F 11/3006* (2013.01); *G06F 11/3051* (2013.01);
(Continued)

(58) Field of Classification Search
CPC .............. G06F 16/285; G06F 16/951; G06F 16/24578; G06F 16/9024; G06F 2009/45595; G06F 9/45558; G06F 16/248; G06F 17/18; G06F 19/00; G06F 21/316; G06F 21/50; G06F 21/55; G06F 21/57; G06F 21/577; G06F 2221/2105;
(Continued)

(56) References Cited

U.S. PATENT DOCUMENTS

| | | | |
|---|---|---|---|
| 2014/0172855 A1* | 6/2014 | Arnoux ................. | G06Q 50/01 707/737 |
| 2015/0269243 A1* | 9/2015 | Kobayashi ........... | G06F 16/285 707/737 |

(Continued)

OTHER PUBLICATIONS

Fesehaye et al., "Group Clusterin Using Inter-Group Dissimilarities", Distributed Computing Systems (ICDCS), 2017 IEEE 37th International Conference on Jun. 5-6, 2017.

*Primary Examiner* — Djenane M Bayard
(74) *Attorney, Agent, or Firm* — Patterson + Sheridan, LLP

(57) ABSTRACT

Certain embodiments described herein are generally directed to improving performance of one or more machines within a system by clustering multidimensional datasets relating to the performance of the machines using inter-group dissimilarities between groups of the dataset. The method for improving performance of one or more machines within a system, includes forming a multidimensional dataset having a plurality of groups using performance related data associated with one or more machines in the system, clustering the plurality of groups into one or more clusters based on intergroup dissimilarities between the plurality of groups, identifying one or more anomalous clusters from among the one or more clusters, identifying the one or more anomalous groups in the one or more anomalous clusters, and adjusting a configuration of the system to improve the performance of the one or more machines corresponding to the one or more anomalous groups.

24 Claims, 13 Drawing Sheets

(51) Int. Cl.
    *H04L 12/24*     (2006.01)
    *G06F 11/34*     (2006.01)
    *H04L 29/08*     (2006.01)

(52) U.S. Cl.
    CPC ...... *G06F 11/3433* (2013.01); *G06F 11/3452* (2013.01); *G06F 11/3476* (2013.01); *G06F 16/283* (2019.01); *H04L 41/0813* (2013.01); *H04L 67/1097* (2013.01)

(58) Field of Classification Search
CPC . G06F 3/017; G06F 3/048; G06F 9/06; G06F 11/0709; G06F 11/079; G06F 11/0793; G06F 11/3006; G06F 16/7867; G06F 16/9535; G06F 17/2785; G06F 17/5009; G06F 1/163; G06F 21/31; G06F 2217/16; G06F 3/0482; G06F 11/00; G06F 11/3409; H04L 41/0893; H04L 67/2842; H04L 41/08; H04L 41/0813; H04L 41/0816; H04L 67/1097; H04L 41/0869; H04L 41/12; H04L 41/50; H04L 41/5041; H04L 41/509; H04L 43/08; H04L 43/10; H04L 43/16; H04L 47/70; H04L 61/1511; H04L 61/1535; H04L 61/6009; H04L 65/403; H04L 65/60; H04L 67/2885; H04L 67/1002; H04L 67/1014

See application file for complete search history.

(56) References Cited

U.S. PATENT DOCUMENTS

| | | | |
|---|---|---|---|
| 2016/0253192 A1* | 9/2016 | Singaravelu | G06F 9/45537 718/1 |
| 2018/0316707 A1* | 11/2018 | Dodson | H04L 63/1425 |

* cited by examiner

| Group 1 | | | | | Group 2 | | | | | ... | Group g | | | |
|---|---|---|---|---|---|---|---|---|---|---|---|---|---|---|
| $M_{11}$ | $M_{12}$ | ... | $M_{1k}$ | | $M_{21}$ | $M_{22}$ | ... | $M_{2k}$ | | ... | $M_{g1}$ | $M_{g2}$ | ... | $M_{gk}$ |
| $v_{111}$ | $v_{112}$ | ... | $v_{11k}$ | | $v_{121}$ | $v_{122}$ | ... | $v_{12k}$ | | ... | $v_{1g1}$ | $v_{1g2}$ | ... | $v_{1gk}$ |
| $v_{211}$ | $v_{212}$ | ... | $v_{21k}$ | | $v_{221}$ | $v_{222}$ | ... | $v_{22k}$ | | ... | $v_{2g1}$ | $v_{2g2}$ | ... | $v_{2gk}$ |
| ... | ... | ... | ... | | ... | ... | ... | ... | | ... | ... | ... | ... | ... |
| $v_{r11}$ | $v_{r12}$ | ... | $v_{r1k}$ | | $v_{r21}$ | $v_{r22}$ | ... | $v_{r2k}$ | | ... | $v_{rg1}$ | $v_{rg2}$ | ... | $v_{rgk}$ |

FIG. 2

|  | $M_1$ | $M_2$ | $\cdots$ | $M_k$ |
|---|---|---|---|---|
| Group 1 | $v_{111}$ | $v_{112}$ | $\cdots$ | $v_{11k}$ |
| | $v_{211}$ | $v_{212}$ | $\cdots$ | $v_{21k}$ |
| | $\cdots$ | $\cdots$ | $\cdots$ | $\cdots$ |
| | $v_{r11}$ | $v_{r12}$ | $\cdots$ | $v_{r1k}$ |
| Group 2 | $v_{121}$ | $v_{122}$ | $\cdots$ | $v_{12k}$ |
| | $v_{221}$ | $v_{222}$ | $\cdots$ | $v_{22k}$ |
| | $\cdots$ | $\cdots$ | $\cdots$ | $\cdots$ |
| | $v_{r21}$ | $v_{r22}$ | $\cdots$ | $v_{r2k}$ |
| | $\cdots$ | $\cdots$ | $\cdots$ | $\cdots$ |
| Group $g$ | $v_{1g1}$ | $v_{1g2}$ | $\cdots$ | $v_{1gk}$ |
| | $v_{2g1}$ | $v_{2g2}$ | $\cdots$ | $v_{2gk}$ |
| | $\cdots$ | $\cdots$ | $\cdots$ | $\cdots$ |
| | $v_{rg1}$ | $v_{rg2}$ | $\cdots$ | $v_{rgk}$ |

FIG. 3

| | $M_{11}$ | $M_{12}$ | ... | $M_{1k}$ | Class |
|---|---|---|---|---|---|
| | $v_{111}$ | $v_{112}$ | ... | $v_{11k}$ | 0 |
| | $v_{211}$ | $v_{212}$ | ... | $v_{21k}$ | 0 |
| | ... | ... | ... | ... | 0 |
| | $v_{r11}$ | $v_{r12}$ | ... | $v_{r1k}$ | 0 |
| | $v_{121}$ | $v_{122}$ | ... | $v_{12k}$ | 1 |
| | $v_{221}$ | $v_{222}$ | ... | $v_{22k}$ | 1 |
| | ... | ... | ... | ... | 1 |
| | $v_{r21}$ | $v_{r22}$ | ... | $v_{r2k}$ | 1 |
| | ... | ... | ... | ... | ... |
| | $v_{1g1}$ | $v_{1g2}$ | ... | $v_{1gk}$ | 1 |
| | $v_{2g1}$ | $v_{2g2}$ | ... | $v_{2gk}$ | 1 |
| | ... | ... | ... | ... | 1 |
| | $v_{rg1}$ | $v_{rg2}$ | ... | $v_{rgk}$ | 1 |

Data Points of Metric Group 1 (rows 1–4)
Data Points of Metric Group 2 (rows 5–8)
Data Points of Metric Group $g$ (last rows)

FIG. 5

| | $M_1$ | $M_2$ | ... | $M_k$ | Class |
|---|---|---|---|---|---|
| | $v_{111}$ | $v_{112}$ | ... | $v_{11k}$ | 0 |
| | $v_{211}$ | $v_{212}$ | ... | $v_{21k}$ | 0 |
| | ... | ... | ... | ... | 0 |
| | $v_{r11}$ | $v_{r12}$ | ... | $v_{r1k}$ | 0 |
| | $v_{121}$ | $v_{122}$ | ... | $v_{12k}$ | 1 |
| | $v_{221}$ | $v_{222}$ | ... | $v_{22k}$ | 1 |
| | ... | ... | ... | ... | 1 |
| | $v_{r21}$ | $v_{r22}$ | ... | $v_{r2k}$ | 1 |
| | ... | ... | ... | ... | ... |
| | $v_{1g1}$ | $v_{1g2}$ | ... | $v_{1gk}$ | 1 |
| | $v_{2g1}$ | $v_{2g2}$ | ... | $v_{2gk}$ | 1 |
| | ... | ... | ... | ... | 1 |
| | $v_{rg1}$ | $v_{rg2}$ | ... | $v_{rgk}$ | 1 |

Data Points of Data Point Group 1

Data Points of Data Point Group 2

Data Points of Data Point Group g

FIG. 6

| | G1 | G2 | ... | Gg |
|---|---|---|---|---|
| $M_1$ | $W_{11}$ | $W_{21}$ | ... | $W_{g2}$ |
| $M_2$ | $W_{12}$ | $W_{22}$ | ... | $W_{g2}$ |
| ... | ... | ... | ... | ... |
| $M_k$ | $W_{1k}$ | $W_{2k}$ | ... | $W_{gk}$ |

Table 700

| $M_{11}$ | $M_{12}$ | ... | $M_{1k}$ | Class |
|---|---|---|---|---|
| $v_{111}$ | $v_{112}$ | ... | $v_{11k}$ | 0 |
| $v_{211}$ | $v_{212}$ | ... | $v_{21k}$ | 0 |
| ... | ... | ... | ... | 0 |
| $v_{r11}$ | $v_{r12}$ | ... | $v_{r1k}$ | 0 |
| $v_{111}$ | $v_{112}$ | ... | $v_{11k}$ | 1 |
| $v_{211}$ | $v_{212}$ | ... | $v_{21k}$ | 1 |
| ... | ... | ... | ... | 1 |
| $v_{r11}$ | $v_{r12}$ | ... | $v_{r1k}$ | 1 |

⎫ Data Points of Metric Group 1 (rows 1-4)
⎫ Data Points of Metric Group 1 (rows 5-8)

FIG. 9

| $M_1$ | $M_2$ | ... | $M_k$ | Class |
|---|---|---|---|---|
| $v_{111}$ | $v_{112}$ | ... | $v_{11k}$ | 0 |
| $v_{211}$ | $v_{212}$ | ... | $v_{21k}$ | 0 |
| ... | ... | ... | ... | 0 |
| $v_{r11}$ | $v_{r12}$ | ... | $v_{r1k}$ | 0 |
| $v_{111}$ | $v_{112}$ | ... | $v_{11k}$ | 1 |
| $v_{211}$ | $v_{212}$ | ... | $v_{21k}$ | 1 |
| ... | ... | ... | ... | 1 |
| $v_{r11}$ | $v_{r12}$ | ... | $v_{r1k}$ | 1 |

⎫ Data Points of Data Point Group 1 (rows 1-4)
⎫ Data Points of Data Point Group 1 (rows 5-8)

FIG. 10

| | $M_{11}$ | $M_{12}$ | ... | $M_{1k}$ | Class |
|---|---|---|---|---|---|
| | $v_{111}$ | $v_{112}$ | ... | $v_{11k}$ | 0 |
| | $v_{211}$ | $v_{212}$ | ... | $v_{21k}$ | 0 |
| | ... | ... | ... | ... | 0 |
| | $v_{r11}$ | $v_{r12}$ | ... | $v_{r1k}$ | 0 |
| | $v_{121}$ | $v_{122}$ | ... | $v_{12k}$ | 1 |
| | $v_{221}$ | $v_{222}$ | ... | $v_{22k}$ | 1 |
| | ... | ... | ... | ... | 1 |
| | $v_{r21}$ | $v_{r22}$ | ... | $v_{r2k}$ | 1 |

Data Points of Metric Group 1: rows 1–4
Data Points of Metric Group 2: rows 5–8

FIG. 11

| | $M_1$ | $M_2$ | ... | $M_k$ | Class |
|---|---|---|---|---|---|
| | $v_{111}$ | $v_{112}$ | ... | $v_{11k}$ | 0 |
| | $v_{211}$ | $v_{212}$ | ... | $v_{21k}$ | 0 |
| | ... | ... | ... | ... | 0 |
| | $v_{r11}$ | $v_{r12}$ | ... | $v_{r1k}$ | 0 |
| | $v_{121}$ | $v_{122}$ | ... | $v_{12k}$ | 1 |
| | $v_{221}$ | $v_{222}$ | ... | $v_{22k}$ | 1 |
| | ... | ... | ... | ... | 1 |
| | $v_{r21}$ | $v_{r22}$ | ... | $v_{r2k}$ | 1 |

Data Points of Data Point Group 1: rows 1–4
Data Points of Data Point Group 2: rows 5–8

FIG. 12

| $i_g$ | $W_{1g}$ | $W_{2g}$ | ⋮ | $W_{gg}$ |
|---|---|---|---|---|
| ⋮ | ⋮ | ⋮ | ⋮ | ⋮ |
| $i_2$ | $W_{12}$ | $W_{22}$ | ⋮ | $W_{g2}$ |
| $i_1$ | $W_{11}$ | $W_{21}$ | ⋮ | $W_{g1}$ |
|  | $i_1$ | $i_2$ | ⋮ | $i_g$ |

Table 1300

GROUP CLUSTERING USING INTER-GROUP DISSIMILARITIES

BACKGROUND

Various systems have natural groupings. For example, large scale distributed systems can have groups of virtual and/or physical devices. A system can also have groups of time series datasets collected at different time intervals. Such groups are usually characterized by one or more multidimensional metrics (features) datasets. Clustering groups within these datasets has wide ranging applications. For example, clustering may help identify anomalous groups and, therefore, anomalous virtual and/or physical devices within a distributed system. The table below illustrates an example of a 2D dataset with metrics, such as $M_q$ for metric q (where q=1, 2, ..., N), in the headers/columns, and data point observations, such as $v_{iq}$ for data point i of metric q in the rows.

| $M_1$ | $M_2$ | ... | $M_N$ |
|---|---|---|---|
| $v_{11}$ | $v_{12}$ | ... | $v_{1N}$ |
| $v_{21}$ | $v_{22}$ | ... | $v_{2N}$ |
| ... | ... | ... | ... |
| $v_{R1}$ | $v_{R2}$ | ... | $v_{RN}$ |

The 2D dataset shown above, for example, is derived from performance data belonging to a single machine over a certain period of time. In such an example, metrics $M_1$ to $M_N$ may be performance metrics belonging to the machine while the data points in each row correspond to performance metric values at, for example, a certain point in time. As an example, the first row may show metric values measured at $t_1$ while row 2 may show metric values at $t_1+5$ mins, and row 3 may show metric values at $t_1+10$ mins, etc.

Although traditional algorithms, such as the K-means clustering algorithm, are suitable for clustering 2D datasets (i.e., a tabular dataset with metric names as columns and per-metric data points forming the rows as shown in the table above), such as the one shown above, in many practical real world systems and applications, datasets are typically multidimensional (e.g., three or more dimensions). However, traditional algorithms are not suitable for clustering multidimensional datasets.

BRIEF DESCRIPTION OF THE DRAWINGS

FIG. 2 illustrates an example formation of a number of metric groups, with a plurality of metrics in each metric group, according to some embodiments.

FIG. 3 illustrates an example formation of a number of data point groups, according to some embodiments.

FIG. 5 illustrates an example classification of the metric groups of the dataset of FIG. 2, according to some embodiments.

FIG. 6 illustrates an example classification of the data point groups of the dataset of FIG. 3, according to some embodiments.

FIG. 9 illustrates an example classification of the metric groups (metric group 1 vs. metric group 1) of the dataset of FIG. 2, according to some embodiments.

FIG. 10 illustrates an example classification of the data point groups (data point group 1 vs. data point group 1) of the dataset of FIG. 3, according to some embodiments.

FIG. 11 illustrates an example classification of the metric groups (metric group 1 vs. metric group 2) of the dataset of FIG. 2, according to some embodiments.

FIG. 12 illustrates an example classification of the data point groups (data point group 1 vs. data point group 2) of the dataset of FIG. 3, according to some embodiments.

DETAILED DESCRIPTION

In large scale distributed systems (e.g., virtual storage area network (VSAN), server virtualization systems, and network virtualization systems), clustering devices (e.g., virtual or physical), virtual machines (VMs), and/or hosts based on their performance metrics is very beneficial. As an example, clustering datasets relating to devices in a VSAN environment helps find anomalous or overloaded devices, such as magnetic disks (MD) and solid state disk (SSD) in the VSAN environment. In another example, in a server virtualization system, clustering virtual machines (VMs) into different performance levels can also be advantageous when performing load balancing. Certain embodiments described herein relate to clustering multidimensional datasets relating to these large scale systems using intergroup dissimilarities within the datasets.

Figure 1:
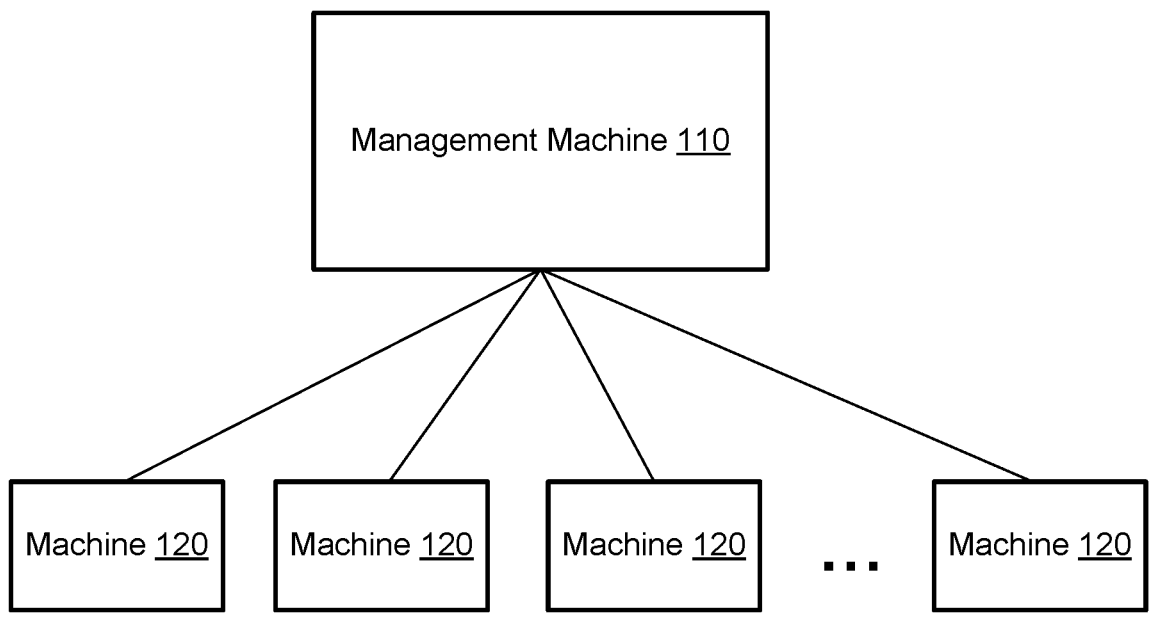
FIG. 1 illustrates an example system with a number of machines, according to some embodiments.

FIG. 1 illustrates an example system with a number of machines 120, each performing some type of action or running some type of workload. In some embodiments, management machine 110, which is connected to one or more of machines 120, is able to obtain data relating to the performance of each of machines 120 over time. In some embodiments, management machine 110 is connected to one or more machines 120 through a network (e.g., a local area network (LAN), a wide area network (WAN), or the Internet.)

For a system such as system 100, a three dimensional dataset can be generated by grouping performance metrics of all machines 120 such that each group of performance metrics would represent, or belong to, a single machine (e.g., single natural set). An example of such a three dimensional (e.g., metric, time, and machine) dataset is shown in FIG. 2.

FIG. 2 illustrates the formation of metric groups 1-g, with k metrics in each group and r rows. Each data point in each metric group is represented as $v_{rgk}$, where $v_{rgk}$ corresponds to a data point in row r of group g and metric k. The value of r for each group may be different, but to simplify the description of the dataset, the same symbol r is used for all groups. All groups have the same number k and type of metrics. Groups with fewer metrics may have dummy entries with 0 values for absent metrics/data points. In some embodiments, as described above, each metric group g represents performance data relating to a single machine (e.g., machine 120) in a system (e.g., system 100). For example, metrics 1-k correspond to performance metrics of each machine and the data points in each row correspond to performance metric values at a certain point in time. In such an example, row 1 (r=1) may include performance metric values at $t_1$, while row 2 (r=2) may include performance metric values at $t_2$, etc.

Another example of a multidimensional dataset can be generated if a dataset of one group of metrics (e.g., the 2D dataset of FIG. 1) is formed into different groups of data points using an additional dimension. As an example, in some embodiments, performance data of a single machine 120 is divided into different groups of data points using an additional factor or dimension of time. For instance, for each machine 120, a plurality of data point groups can be generated from the machine's performance data, where each data point group is collected on a separate date or day. An example of this type of three dimensional dataset is shown in FIG. 3.

FIG. 3 illustrates an example formation of data point groups 1-g, where $M_1$ to $M_k$ correspond to a single group of K metrics for a single machine. Each data point in each data point group is represented as $v_{rgk}$, where r is for row r of group g and metric k. As described above, in some embodiments, each data point group represents performance data points of a machine collected over time on a certain date. For example, the data points in Group 1 correspond to performance metric values collected over a certain period of time (e.g., 3 hours) on a certain date (e.g., Jan. 1, 2017), where the group numbers g correspond to dates. In such an example, each row represents a certain increment of time. For example, row 1 shows performance metric values collected at the start of the three hour period (i.e., $t_1$), row 2 shows performance metric values collected at $t_1$+5 mins, . . . , and the last row shows performance metric values collected at the end of the three hour period. Similarly, the data points in Group 2 correspond to performance metric values collected over 3 hours on a second date (e.g., Jan. 2, 2017), while the data points in Group 3 correspond to performance metric values collected over 3 hours on a third date (e.g., Jan. 3, 2017), and so on. The third dimension here is the additional time dimension (dates) that allows for grouping the data points such that each group of data points corresponds to performance metric values collected on a different date.

In embodiments where a dataset is multidimensional, such that the dataset comprises multiple groups as shown in FIG. 2 (with multiple metric groups) and 3 (with multiple data point groups), clustering the groups (i.e., assigning each group to one or more clusters based on their data points) is very advantageous. For instance, in some embodiments, clustering is performed to find anomalous groups. In the case of FIG. 2, clustering may identify a group of one or more anomalous machines that didn't perform like others and, in the case of FIG. 3, clustering may identify a group of anomalous dates on which the machine's performance was very different from the other dates. In some embodiments, once such anomalous group(s) is/are found, more focused analysis is performed to examine the exact root cause of a performance regression.

As a result, group clustering allows the identification of anomalous groups and the root causes of the anomaly. Group clustering using a multidimensional dataset, however, is challenging. Existing dataset clustering algorithms (e.g., K-means) are not suitable for group clustering applications where each group has its own multidimensional time series dataset.

Accordingly the embodiments discussed herein relate to methods of clustering multidimensional datasets using inter-group dissimilarities between the groups. In some embodiments, as described in relation to FIG. 4, the clustering is performed using a group clustering algorithm that may be referred to as a one-to-many ("1toM") group clustering algorithm. In some embodiments, as described in relation to FIGS. 8a-8b, the clustering is performed using a group clustering algorithm that may be referred to as a pairwise ("PW") group clustering algorithm.

Figure 4:
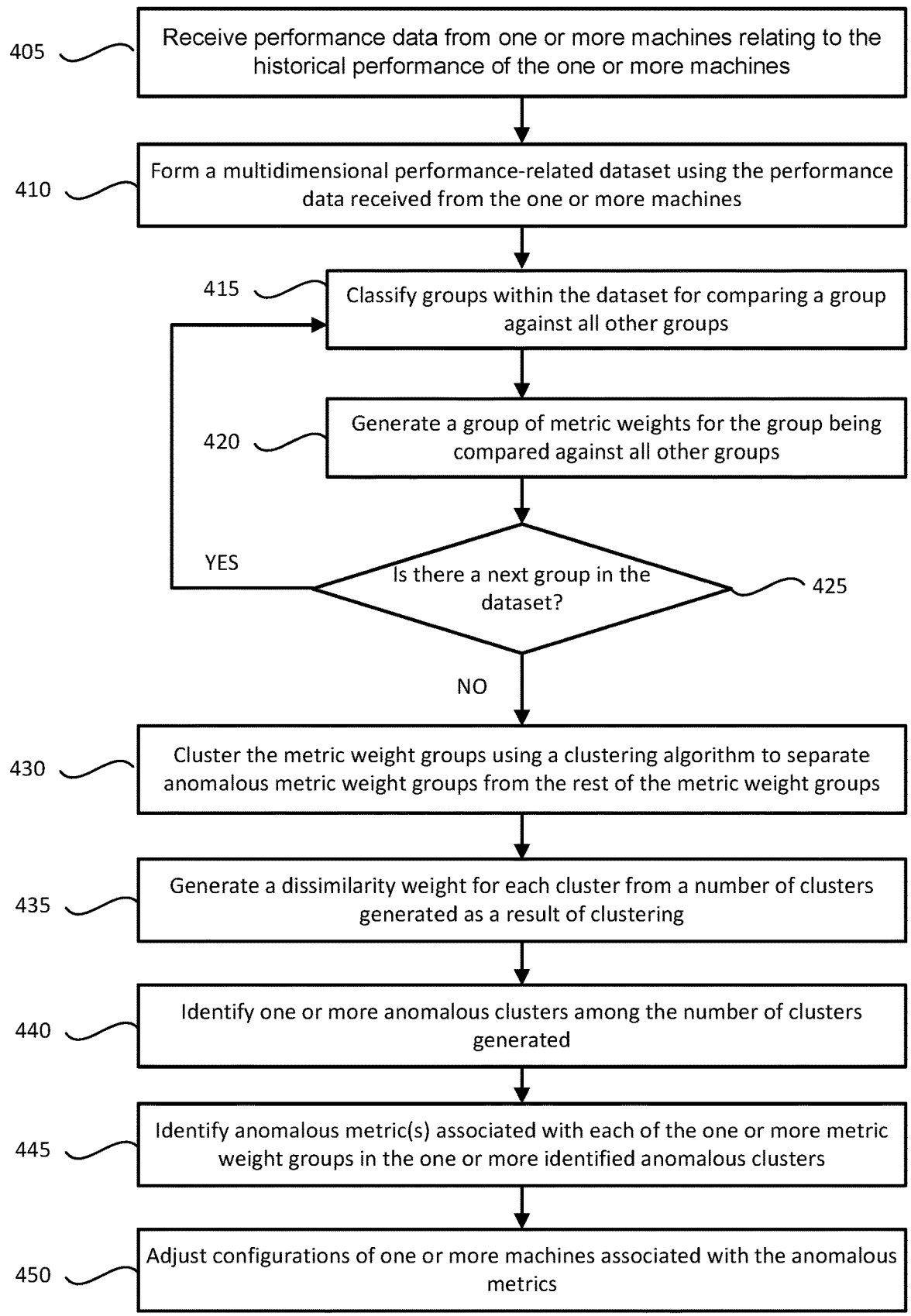
FIG. 4 illustrates an example flow diagram of a management machine using a one-to-many group clustering algorithm to determine anomalies in a multidimensional performance-related dataset of one or more machines, according to some embodiments.

FIG. 4 illustrates an example flow diagram of a management machine (e.g., management machine 110) using the 1toM group clustering algorithm to determine anomalies in a multidimensional performance-related dataset of one or more machines, identify root causes of the anomalous group(s) (e.g., corresponding to machines or other factors (e.g., dates)) within the dataset, and change configurations of one or more machines based on the determined root causes.

At step 405, management machine 110 receives performance data from one or more machines 120 relating to the historical performance of the one or more machines 120. For example, in some embodiments, each one of the one or more machines 120 is configured to monitor its performance over one or more time periods and generate and store data relating to the performance. Each one of the one or more machines 120 is also configured to then transmit the performance-related data to management machine 110.

At step 410, using the performance data received from one or more machines 120, management machine 110 then forms a multidimensional performance-related dataset such as those shown in FIGS. 2 and 3.

As an example, in some embodiments, g number of machines (e.g., machines 120) periodically send their historic performance-related data to management machine 110, based on which management machine 110 forms or generates a multidimensional dataset shown in FIG. 2, as described above. The dataset of FIG. 2, as described above, includes metric groups 1-g, each having k metrics and r rows. In another example, a single machine sends management machine 110 performance-related data, based on which management machine 110 forms or generates a multidimensional dataset shown in FIG. 3. As described above, the dataset of FIG. 3 includes data point groups 1-g, each having the same k metrics and r rows. In the embodiments described herein, the term "historic performance" is meant to refer to any performance that took place before data relating to the performance is received by management machine 110.

Having formed a multidimensional performance-related dataset, machine 110 utilizes the 1toMany group clustering algorithm to compare data points of each group against data points of all other groups of the dataset of, for example, FIG. 2 and/or FIG. 3. The operations of the 1toMany group clustering algorithm are described in the following steps.

At step 415, management machine 110 classifies the groups of the multidimensional performance-related dataset for comparing a group against all other groups. In some embodiments, management machine 110 performs the classification by creating two classes of data points within the multidimensional performance-related dataset. For example, management machine 110 classifies data points of the group being compared against all other groups as the first class (e.g., labeled 0, as described below) and classifies data points of all other groups as the second class (e.g., labeled 1, as described below).

FIG. 5 illustrates an example classification of the metric groups of the dataset of FIG. 2. As shown, data points of metric group 1 of the dataset of FIG. 2 are classified with label 0 while data points of all other metric groups (i.e., metric groups 2-g) are classified with label 1.

FIG. 6 illustrates an example classification of the data point groups of the dataset of FIG. 3. As shown, data points of data point group 1 of the dataset of FIG. 3 are classified with label 0 while data points of all other data point groups (i.e., data point groups 2-g) are classified with label 1.

Referring back to FIG. 4, at step 420, management machine 110 generates a list or group of metric or dissimilarity weights using an algorithm such as information gain, correlation coefficient, or other algorithms for the group (e.g., group labeled 0) being compared against all other groups. For example, management machine 110 takes the labeled dataset of FIG. 6 as a supervised learning input and uses an information gain algorithm to compare the data points of data point group 1 against the data points of all other data point groups of FIG. 6 and, therefore, generate a group of metric weights for data point group 1. Each metric weight, $W_{UV}$ (where U corresponds to the data point group number (U=1, 2, . . . , g) and V corresponds to the metric (V=1, 2, . . . , k)), in the group represents a degree of separation (i.e., anomaly) of the data points of metric V from group U from the data points of the same metric from all other data point groups.

As an example, when running an information gain algorithm for comparing the data points of data group 1 against the data points of all other data point groups of FIG. 6, a group of metric weights such as $W_{11}, W_{12}, \ldots, W_{1K}$ (as shown in table 700 of FIG. 7 below) is generated, where, for example, $W_{11}$ corresponds to the degree of separation of the data points of metric 1 (M1) of data point group 1, of the dataset of FIG. 6, from the data points of metric 1 from all the other data point groups (i.e., data group 2 to data group g). In such embodiments, a higher metric weight indicates a larger degree of separation.

At step 425, management machine 110 determines if there is a next group in the dataset. For example, after generating a group of metric weights for data point group 1 of FIG. 6, management machine determines that there are additional groups in the dataset of FIG. 3 and, therefore, returns to step 415 to classify the groups within the dataset for comparing the next group (e.g., data point group 2) against all the other groups (i.e., data point groups 1 and 3-g). In such an example, data points of data point group 2 are labeled 0 while the data points of all other groups are labeled with 1. After performing this classification, management machine 110 moves to step 420 again to generate a group of metric weights for data point group 2 ($W_{21}, W_{22}, \ldots, W_{2K}$, as shown in table 700 of FIG. 7 below). Management machine 110 then continues to loop through steps 415-425 until it generates a group of metric weights for each and every group of the dataset in the same manner.

Figure 7:
FIG. 7 illustrates an example table resulting from comparing data points in each group against the data points of all the other groups in the dataset of FIG. 3, according to some embodiments.

FIG. 7 illustrates example table 700, which is what results from comparing the data points in each group against the data points of all the other groups in a dataset such as the dataset of FIG. 3 (e.g., or dataset of FIG. 2). For example, each row (e.g., from rows 1-g) in table 700 of FIG. 7 may correspond to a group of metric weights derived for the group (G1-Gg) (e.g., data point group or metric group) corresponding to the row. As an example, the group of metric weights ($W_{11}, W_{12}, \ldots, W_{1K}$) in the second row (i.e., row 1) of FIG. 7 corresponds to metric weights derived for G1 or group 1 (e.g., data point group 1 of FIG. 3) of a respective dataset (e.g., dataset of FIG. 3). As described above, each metric weight corresponds to the degree of separation of a certain metric's data points within a group from the same metric's data points in all the other groups of the dataset. Accordingly, table 700 effectively illustrates the inter-group dissimilarities between groups of a dataset. For example, in each group of metric weights (G1-Gg), the highest or largest metric weight indicates the main degree of separation between the respective group and the other groups. As an example, assuming $W_{11}$ has the highest value out of the metric weight group ($W_{11}, W_{12}, \ldots, W_{1K}$) associated with group 1 (i.e., G1), $W_{11}$ would then be considered the dissimilarity weight of group 1 that indicates the largest degree of separation from other groups. In another example, an average or sum of all the metric weights in a metric weight group (e.g., ($W_{11}, W_{12}, \ldots, W_{1K}$)÷K) associated with a group (e.g., G1) is considered as the dissimilarity weight that best separates the group from all other groups.

In some embodiments, the metric weights generated, as described above, are complimented or adjusted using domain knowledge to improve the accuracy of the metric weights. Domain knowledge refers to outside information (e.g., expert knowledge) that indicates, for example, a certain metric is more important than other metrics in terms of evaluating the performance of a specific system. As a result, in such an example, the weight of a metric with a high importance is adjusted upwards or the weight of a metric with a low importance is adjusted downwards. In some embodiments, to adjust each metric weight, the metric weight is multiplied by a domain knowledge multiplier ($d_k$), where K=1, 2, . . . , N. As a result, to incorporate the domain knowledge in the 1toM algorithm, the metric weights $W_{gk}$ shown in FIG. 7 are replaced with $d_k W_{gk}$. In some embodiments, each domain knowledge weight $d_k$ is proportionally normalized so that its value is between 0 and 1.

Referring back to FIG. 4, at step 430, management machine 110 clusters the metric weight groups (e.g., metric weight groups associated with groups G1-Gg), each represented as a row, of table 700 using a clustering algorithm (e.g., the K-means or any other clustering algorithm) to separate anomalous metric weight groups from the rest of the metric weight groups. In some embodiments, the clustering is performed using the highest metric weight in the metric group associated with each group (e.g., G1-Gg). In some embodiments, the clustering is performed using the sum or average of the metric weights associated with each group. In some embodiments, the clustering is performed using all metric weights in a metric group associated with each group. What results from clustering the groups of, for example, table 700 are a number of clusters each including one or more groups, each group having a dissimilarity weight, as described above.

At step 435, management machine 110 generates a dissimilarity weight for each cluster from a number of clusters generated as a result of clustering the groups at step 430. In some embodiments, each cluster's dissimilarity weight is a function of the dissimilarity weights of the groups in the cluster. In some embodiments, each cluster's dissimilarity weight is the maximum of the dissimilarity weights of the groups. For example, a cluster may include groups G1-G4 with weights of 0.3, 0.2, 0.6, 0.9, respectively. In such an example, the cluster's dissimilarity weight is 0.9, which is the maximum dissimilarity weight of all the group dissimilarity weights. In some embodiments, each cluster's dissimilarity weight is the average or sum (e.g., or any other function) of all the dissimilarity weights of the groups.

At step 440, management machine 110 identifies one or more anomalous clusters among the number of clusters generated as a result of clustering the groups at step 430. In some embodiments, management machine 110 identifies a cluster as anomalous if the cluster's dissimilarity weight is higher than the dissimilarity weights of all of the other clusters by a threshold amount. In some embodiments, management machine 110 identifies a cluster as anomalous if the cluster's dissimilarity weight is higher than the average dissimilarity weights of all of the other clusters by a threshold amount. The 1toM group clustering algorithm, as described above, is especially advantageous in identifying clusters of a few groups, which behave differently from the rest of the groups.

At step 445, management machine 110 identifies anomalous metric(s) associated with each of the one or more metric weight groups in the one or more anomalous clusters identified at step 440. As an example, an anomalous cluster may include 2 groups of metric weights (e.g., G1 and G2 as shown in FIG. 7), each including k metric weights (e.g., G1 including ($W_{11}$, $W_{12}$, ..., $W_{1K}$) and G2 including ($W_{21}$, $W_{22}$, ..., $W_{2K}$)). For example, where the clustering is performed on a dataset such as the dataset of FIG. 2, G1 may be associated with machine $120_1$ and G2 may be associated with associated with machine $120_2$. Management machine 110 selects one or more metrics within each group as outliers or anomalous based on the metrics' correspond weights. For example, in some embodiments, management machine 110 selects one or more metrics whose metric weights are higher than a certain threshold. In some other embodiments, management machine 110 selects a metric with the maximum metric weight. As an example, within G2, management machine 110 may select $W_{21}$, which may be the largest metric weight out of all the metric weights (e.g., $W_{21}$, $W_{22}$, ..., $W_{2K}$) of G2 (e.g., corresponding to machine $120_2$). In such an example $W_{21}$ corresponds to metric 1 (M1), which may represent the throughput of machine $120_2$. Accordingly, management machine 110 is able to identify that, for example, machine $120_2$'s throughput is what is causing the anomaly.

In another example, where the clustering is performed on a dataset such as the dataset of FIG. 3, G1 may be associated with date Jan. 1, 2017 and G2 may be associated with associated Jan. 2, 2017. In such an example, management machine 110 may determine that a certain metric is causing the machine's anomaly on Jan. 2, 2017.

At step 450, management machine 110 adjusts configurations of one or more machines in the system based on the anomalous metrics identified at step 445. In the example discussed above, having determined that machine $120_2$'s throughput is what is causing the anomaly, management machine 110 adjusts certain configurations of machine $120_2$ (or other machines) to improve the machine's throughput.

As described above, instead of the 1toM group clustering algorithm, in some embodiments, the PW algorithm is used for clustering groups.

Figure 8A:
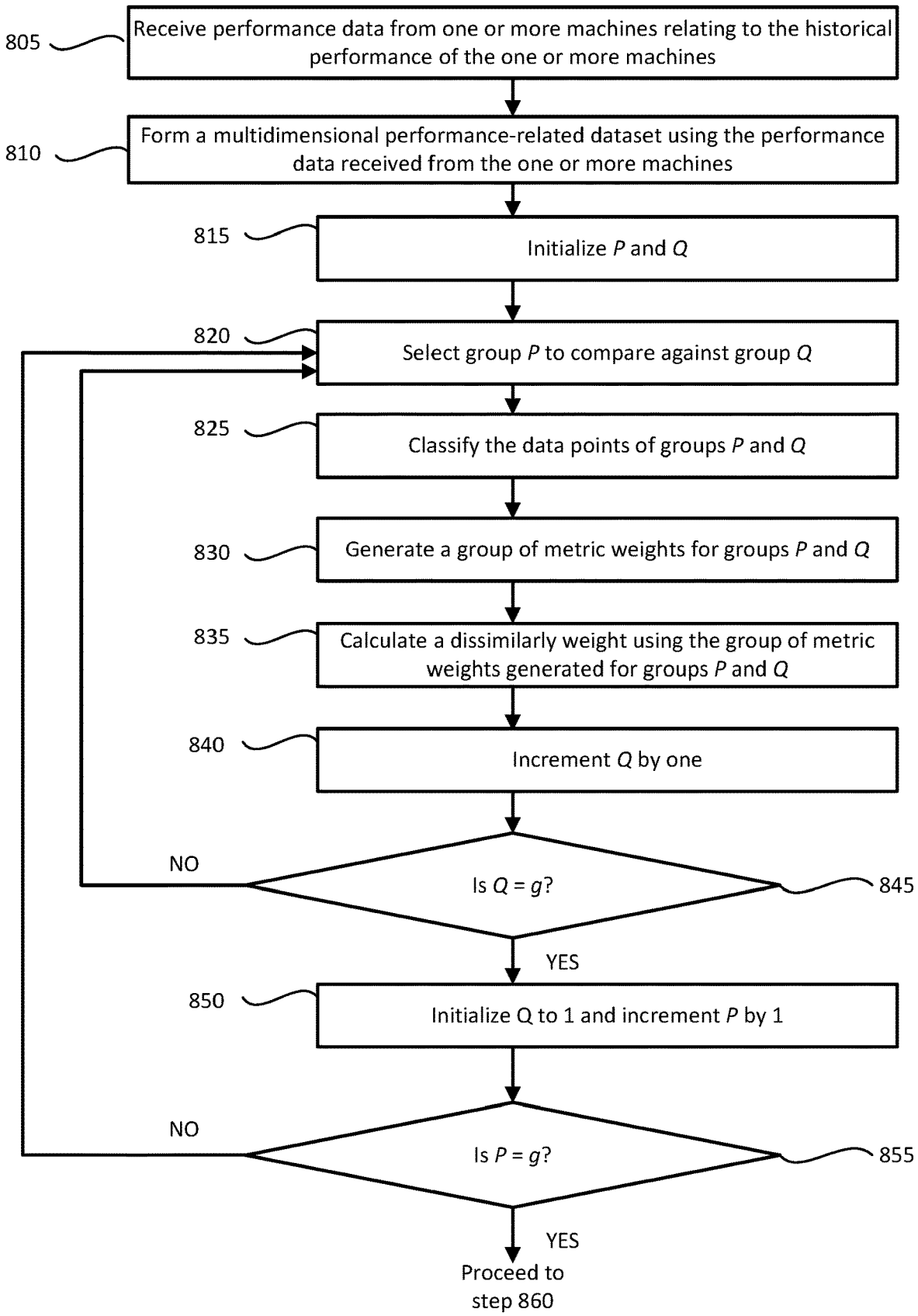
FIGS. 8a-8b illustrates an example flow diagram of a management machine using a pairwise group clustering algorithm to determine anomalies in a multidimensional performance-related dataset of one or more machines, according to some embodiments.
Figure 8B:
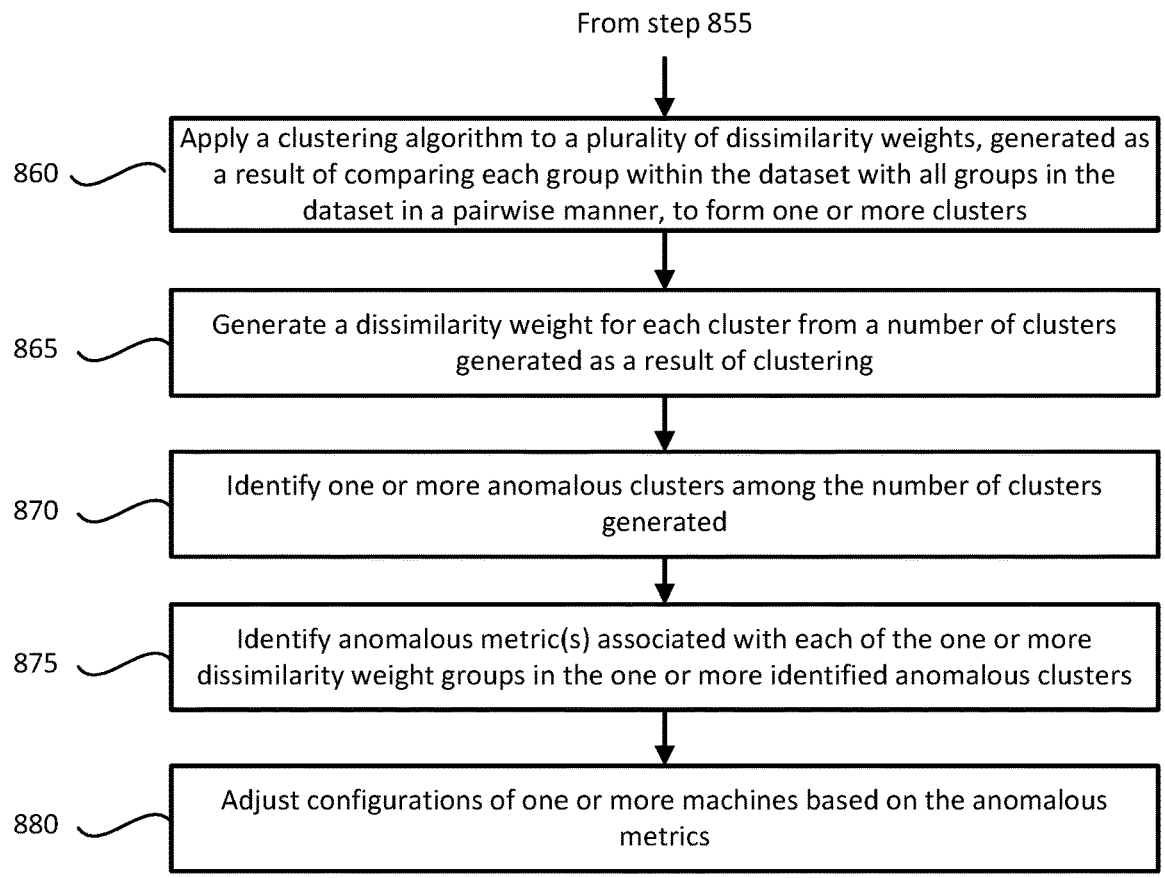

FIGS. 8a-8b illustrate an example flow diagram of a management machine (e.g., management machine 110) using the PW group clustering algorithm to determine anomalies in a multidimensional performance-related dataset of one or more machines, identify root causes of the anomalous group(s) (e.g., corresponding to machines or other factors (e.g., dates)) within the dataset, and change configurations of the machines based on the determined root causes.

At step 805, similar to step 405 of FIG. 4, management machine 110 receives performance data from one or more machines 120 relating to the historical performance of the one or more machines 120.

At step 810, similar to step 410 of FIG. 4, using the performance data received from one or more machines 120, management machine 110 then forms a multidimensional performance-related dataset such as those shown in FIGS. 2 and 3.

As further described below, using the PW group clustering algorithm, management machine 110 compares each group in the multidimensional performance-related dataset against every group (including itself) in the dataset in a pairwise manner. For example, management machine 110 compares the data points of data point group 1 of FIG. 3 against data points of data point group 1 (i.e., itself), and then against the data points of data point group 2, ..., and finally against the data points of data point group g. Subsequently, management machine 110 compares the data points of data point group 2 against the data points of data point group 1, then against the data points of data point group 2 (i.e., itself), followed by the data points of data point group 3, ..., and finally against the data points of data point group g, and so on.

Accordingly, in some embodiments, two counters P and Q are defined to illustrate the following steps of the algorithm. P is the counter for representing the group number of the group being compared against a group whose number is represented by Q, where P, Q=1, 2, ..., g.

At step 815, management machine 110 initializes both P and Q to 1.

At step 820, management machine 110 selects group P to compare against group Q in the performance-related dataset. For example, when both P and Q equal 1, management machine 110 selects data point group 1 of, e.g., FIG. 3 (or FIG. 2) to compare against data point group 1 (itself) in a pairwise manner.

At step 825, management machine 110 classifies the data points of group P and group Q. In some embodiments, management machine 110 performs the classification by creating two classes of data points for differentiating the data points of group P from the data points of group Q. In the example above, management machine 110 may begin the process of comparing data points of group 1 against the data points of group 1 by classifying the first instance of the data points of group 1 as the first class (e.g., labeled 0, as described below) and the second instance of the data points of group 1 as the second class (e.g., labeled 1, as described below).

FIG. 9 illustrates an example classification of the first instance of the data points of metric group 1 and the second instance of the data points of metric group 1 of the dataset of FIG. 2. As shown, the first instance of the data points of metric group 1 is classified with label 0 while the second instance of the data points of metric group 1 is classified with label 1.

FIG. 10 illustrates an example classification of the data point groups of the dataset of FIG. 3. As shown, data points of data point group 1 of the dataset of FIG. 2 are classified with label 0 while data points of data point group 2 are classified with label 1.

Referring back to FIG. 8a, at step 830, management machine 110 generates a list or group of metric or dissimilarity weights using an algorithm such as information gain, correlation coefficient, or other algorithms for group P (e.g., group labeled 0) being compared against group Q (e.g., group labeled 0) in the pair. For example, management machine 110 takes the labeled dataset of FIG. 10, as a supervised learning input, and uses an information gain algorithm to compare the data points of group P (data point group 1, in the example above) against themselves and, therefore, generate a group of metric weights. In such an example, all the metric weights are zero because the data points of data point group 1 are being compared against themselves. As described above, in some embodiments, the metric weights generated, are complimented or adjusted using domain knowledge to improve the accuracy of the metric weights. Accordingly, in such embodiments, each metric weight is multiplied by a domain knowledge multiplier ($d_k$) corresponding to the metric.

At step 835, management machine 110 calculates a dissimilarity metric weight $W_{PQ}$ using the group of metric weights generated for groups P and Q. In some embodiments, a function that outputs the highest metric weight from the group of metric weights is used for calculating the dissimilarity metric weights. Accordingly, in such embodiments, the dissimilarity weight is the highest metric weight (i.e., metric weight with the highest value) out of the metric weights generated for group P at step 830. In some embodiment, a function that outputs the sum or the average of the metric weights is used for calculating the dissimilarity metric weights. Accordingly, in such embodiments, the dissimilarity metric weight is the sum or the average of the metric weights generated for group P at step 830. In other embodiments, other functions may also be used. As described above, where P=1 and Q=1, all the metric weights generated at step 830 are zero and, therefore, the dissimilarity metric weight calculated at step 835 is also zero. After a dissimilarity weight $W_{11}$ is calculated as a result of a comparison performed between group 1 against itself, management machine 110 then proceeds to the following steps to compare group 1 with the next group, which is group 2.

At step 840, management machine 110 increments Q by 1 to allow management machine 110 to compare group P (e.g., group 1) against the next group (e.g., group 2).

At step 845, management machine determines if Q=g. If not, for example, management machine 110 loops through steps 820-840 again and performs a comparison between the data points of group 1 against the data points of the next group, group 2. For example, back at 820, management machine 110 selects group 1 to compare against group 2. At 825, management machine 110 classifies the data points of group 1 and group 2. FIG. 11 illustrate example classifications (i.e., labeled 0) of the data points of metric group 1 and the data points of metric group 2 (i.e., labeled 1) of the dataset of FIG. 2. FIG. 12 illustrate example classifications (i.e., labeled 0) of the data points of data point group 1 and the data points of data point group 2 (i.e., labeled 1) of the dataset of FIG. 2. At 830, management machine 110 generates a group of metric weights for groups 1 and 2, as described above. At 835, management machine 110 calculates a dissimilarity metric weight $W_{12}$ using the group of metric weights generated for groups 1 and 2. Having calculated a metric weight for groups 1 and 2, management machine 110 continues to increment Q and loop through steps 820-840 until Q=g, at which point, management machine 110 has calculated dissimilarity weights for group 1 against each and every one of groups 1-g.

Once, at step 845, management machine 110 determines that Q=g, at step 850, management machine 110 initializes Q to 1 again and increments P by 1. This enables management machine 110 to loop through steps 820-860 until dissimilarity weights are calculated for all combinations of P and Q.

Figure 13:
FIG. 13 illustrates an example table including inter-group dissimilarity weights resulting from comparing data points in each group against data points of each and every other group in a dataset in a pairwise manner, according to some embodiments.

FIG. 13 illustrates an example table including inter-group dissimilarity weights generated as a result of comparing each group in a multidimensional dataset against each and every other group in the set in a pairwise manner as described above. In table 1300, $W_{PQ}$ represents the dissimilarity weight between groups P and Q, where P, Q=1, 2, . . . , g. Also, as shown, $i_k$ represents a group instance (i.e., group), where k=1, 2, . . . , g. For example, for $i_1 i_1$ through $i_1 i_g$, the corresponding dissimilarity weights are $W_{11}$ to $W_{1g}$, where $W_{11}$ is zero, as described above.

Referring back to FIG. 8a, at step 855, management machine 110 determines if P=g, in which case, management machine has calculated dissimilarity weights for all combinations of P and Q, and therefore proceeds to step 860.

At step 860, management machine 110 applies a clustering algorithm to the dissimilarity weights generated for all combinations of P and Q to form one or more clusters. In some embodiments, the clustering algorithm used is the K-means algorithm or the KwikCluster algorithm, etc., although any other clustering algorithm can be used. The KwikCluster algorithm is a fast algorithm, which is able to automatically find the number of clusters. When using the KwikCluster algorithm, in some embodiments, the dissimilarity weights are discretized into binary values using a threshold. For example, if a dissimilarity weight is below the threshold, the dissimilarity weight is set to 0, otherwise it is set to 1. In some embodiments, the number of clusters generated as a result of the application of the KwikCluster algorithm depends on this threshold.

In some embodiments, as described above, the K-means or other similar data clustering algorithms are used to efficiently cluster the groups, each of which is characterized by its dissimilarity weight against all other groups. An example of the application of a clustering algorithm can be illustrated when comparing group instances $i_1$, $i_2$ and $i_3$. The dissimilarity weight values of $i_1$, $i_2$ and $i_3$ are ($w_{11}$, $w_{12}$, . . . , $w_{1g}$), ($w_{21}$, $w_{22}$, . . . $w_{2g}$), and ($w_{31}$, $w_{32}$, . . . $w_{3g}$) respectively. A clustering algorithm which uses a distance metric can obtain distances $d_{12}$ between $i_1$ and $i_2$ and $d_{13}$ between $i_1$ and $i_3$ as follows:

$$d^2_{12} = (w_{11} - w_{21})^2 + (w_{12} - w_{22})^2 + \ldots + (w_{1g} - w_{2g})^2 = 2(w_{12})^2 + (w_{13} - w_{23})^2 + \ldots + (w_{1g} - w_{2g})^2 \quad \text{Equation 1:}$$

$$d^2_{13} = (w_{11} - w_{31})^2 + (w_{12} - w_{32})^2 + \ldots + (w_{1g} - w_{3g})^2 = 2(w_{13})^2 + (w_{12} - w_{32})^2 + \ldots + (w_{1g} - w_{3g})^2 \quad \text{Equation 2:}$$

From equations 1 and 2, where k=1, 2, . . . , g, as described above, the value of $W_{kk}$ equals 0, because the dissimilarity of a group against itself is 0. If the $i_1$ and $i_2$ are highly correlated belonging to the same cluster, their dissimilarity weight, $W_{12}$, is likely small. Also, the correlations $W_{1k}$ and $W_{2k}$ of groups 1 and 2 against any other group (k≠1, 2) are similar, resulting in a smaller $(w_{1k} - w_{2k})^2$.

Applying a clustering algorithm to the groups of dissimilarity weights, an example of which was shown in FIG. 13, results in a number of clusters each having a number of groups (e.g., cluster 1 including $i_1$ and $i_3$ and cluster 2 including $i_2$, $i_5$, $i_6$, and $i_{22}$). In order to find anomalous clusters among the clusters formed at step 860, as described above, a dissimilarity weight is calculated for each cluster.

At step 865, management machine generates a dissimilarity weight for each cluster from a number of clusters formed at step 860. In some embodiments, each cluster's dissimilarity weight is a function of the pairwise dissimilarity weights (e.g., shown in FIG. 14) of the groups in the cluster. For example, in some embodiments, for each group in the cluster, the average (e.g., or sum or maximum in other embodiments) of the pairwise dissimilarity weights in the group is calculated as the dissimilarity weight of that group. Once a dissimilarity weight is calculated for each group in a cluster, then the dissimilarity weight of the cluster is calculated by a function that selects the maximum or highest (e.g., or sum or average in other embodiments) dissimilarity weight out of all the dissimilarity weights of the groups in the cluster.

As with the 1toM clustering algorithm whose operations were described in relation to FIG. 4, once dissimilarity weights are calculated for all clusters formed using the PW algorithm, one or more anomalous clusters are identified.

Accordingly, at step 870, management machine 110 identifies one or more anomalous clusters among the number of clusters formed at step 860. This step is similar to step 440 of FIG. 4.

At step 875, management machine 110 identifies anomalous metric(s) associated with each of the one or more dissimilarity weight groups in the one or more anomalous clusters identified at step 870. For example, a cluster that is identified as an anomalous cluster may include group $i_1$ which comprises dissimilarity metric weights $w_{11}, w_{12}, \ldots, w_{1g}$. In such an example, management machine 110 identifies one or more metrics associated with one or more dissimilarity metric weights that are above a certain threshold.

At 880, management machine 110 adjusts configurations of one or more machines based on the identified anomalous metrics.

Figure 14:
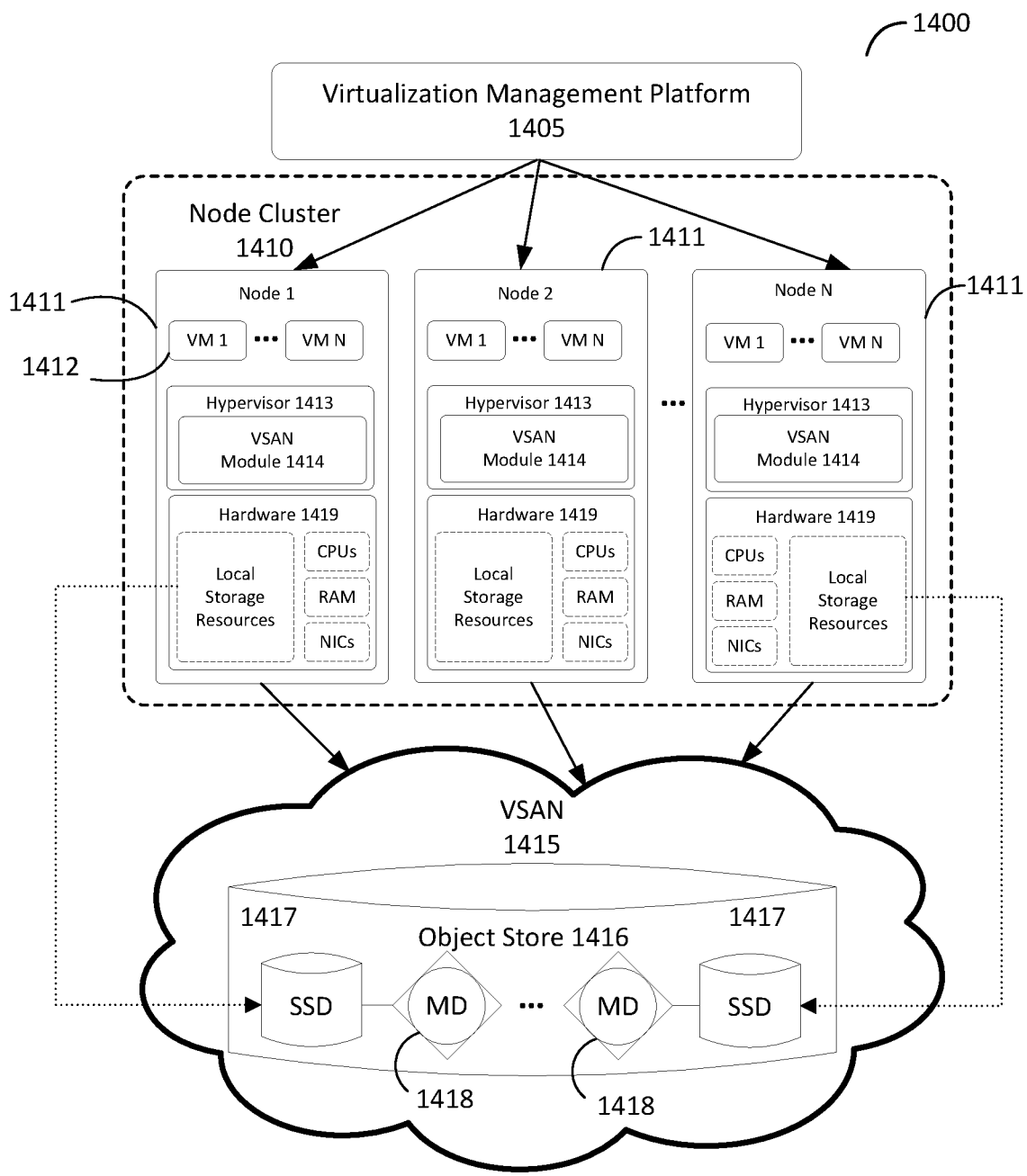
FIG. 14 illustrates a software-based virtual storage area network (VSAN) computing environment, according to some embodiments.

As discussed, the group clustering algorithms described above enable a system to determine anomalies in a multi-dimensional performance-related dataset associated with one or more machines, identify root causes of the anomalous group(s) (e.g., corresponding to machines or other factors (e.g., dates)) within the dataset, and change configurations of one or more machines based on the determined root causes. These group clustering algorithms may be used for any system with one or more machines that generate performance related data, as described above. FIG. 14 illustrates an example system that, in some embodiments, utilizes the group clustering algorithms, as described above, to identify entities or machines (e.g., virtual or physical) with anomalous performance and adjust configurations of such entities or machines accordingly.

FIG. 14 illustrates a computing environment 1400 in which the embodiments described above may be practiced. As described in U.S. application Ser. No. 15/660,753, which is incorporated herein by reference, computing environment 1400 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 1411 of a cluster 1410 to provide an aggregate object store 1416 to virtual machines (VMs) 1412 running on the nodes. The local commodity storage housed in or otherwise directly attached to the nodes 1411 may include combinations of solid state drives (SSDs) 1417 and/or magnetic or spinning disks 1418. In certain embodiments, SSDs 1417 serve as a read cache and/or write buffer in front of magnetic disks 1418 to increase I/O performance. As further discussed below, each node 1411 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. The VSAN module may then create an "object" for the specified virtual disk by backing it with physical storage resources of the object store based on the defined policy.

A virtualization management platform 1405 is associated with cluster 1410 of nodes 1411. Virtualization management platform 1405 enables an administrator to manage the configuration and spawning of VMs on the various nodes 1411. As depicted in the embodiment of FIG. 14, each node 1411 includes a virtualization layer or hypervisor 1413, a VSAN module 1414, and hardware 1419 (which includes the SSDs 1417 and magnetic disks 1418 of a node 1411). Through hypervisor 1413, a node 1411 is able to launch and run multiple VMs 1412. Hypervisor 1413, in part, manages hardware 1419 to properly allocate computing resources (e.g., processing power, random access memory, etc.) for each VM 1412. Furthermore, as described below, each hypervisor 1413, through its corresponding VSAN module 1414, provides access to storage resources located in hardware 1419 (e.g., SSDs 1417 and magnetic disks 1418) for use as storage for virtual disks (or portions thereof) and other related files that may be accessed by any VM 1412 residing in any of nodes 1411 in cluster 1410. U.S. application Ser. No. 15/660,753, which is incorporated herein by reference, further describes the operation details of the VSAN environment 1400 shown in FIG. 14.

The embodiments described above in relation to FIGS. 1-13 are all applicable to the VSAN environment 1400 shown in FIG. 14. Accordingly, in some embodiments, a machine (e.g., machine 120) is a SSD 1417, a magnetic disk 1418, a VM 1412, or a node 1411. In such embodiments, management machine 110 may be a computing device (e.g., physical or virtual) that is connected to VSAN environment 1400 through a network (e.g., LAN, WAN, Internet, etc.) and receives performance data, relating to SSDs 1417, magnetic disks 1418, VMs 1412, and/or nodes 1411, which management machine 110 uses to find anomalous SSDs 1417, magnetic disks 1418, VMs 1412, and/or nodes 1411 or, for example, anomalous dates during which an SSD 1417, a magnetic disk 1418, a VM 1412, or a node 1411 performed abnormally. In some embodiments, the performance includes performance metrics such as data-write throughput, read throughput, write latency, read latency, read operations per second and write operations per second. Having identified anomalies in regards to the performance of one or more machines in a VSAN environment, management machine 110 then adjusts the configurations of the respective machines, as described above in relation to FIGS. 4 and 8a-8b. As an example, the SSD write latency of an SSD shown in FIG. 14 may be high due to, e.g., an incompatibility issue relating to the SSD's driver. To resolve this, in some embodiments, the SSD driver is replaced or fixed. In another example, management machine 110 may identify anomalies in regards to the I/O performance of one or more VMs due to congestion caused by traffic relating to an ongoing VSAN recovery (usually when there is some failure, such as a host, or one or a group of capacity disks).

In such an example, management machine 110 may rate limit the VSAN recovery traffic or other low priority traffic in VSAN.

The VSAN environment 1400 discussed herein is merely a use-case of the broader application of the embodiments described above in relation to FIGS. 1-13. Accordingly, as described above, the group clustering algorithms described in relation to FIGS. 1-13 can be used for any system or environment (e.g., system 100, VSAN environment 1400) having one or more machines (e.g., machines, SSDs, magnetic disks, VMs, nodes, switches, routers, virtual switches, virtual routers, or any other physical or virtual device or entity). In addition, the machines, as described above, may be physical or virtual entities used in various physical or virtual environments (e.g., environments supporting virtual networks, environments supporting virtual servers, environments supporting virtual desktops etc.).

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for improving performance of one or more machines within a system, the method comprising:
forming a multidimensional dataset having a plurality of groups, each group of the plurality of groups corresponding to one of a plurality of machines within the system, the multidimensional dataset formed using performance related data associated with each of the plurality of machines;
clustering the plurality of groups into one or more clusters based on intergroup dissimilarities between the plurality of groups, the intergroup dissimilarities determined by comparing performance related data associated with each group in the plurality of groups against performance related data associated with every other group in the plurality of groups;
identifying one or more anomalous clusters from among the one or more clusters, the one or more anomalous clusters containing at least one group dissimilar to other groups in the plurality of groups;
identifying the one or more anomalous groups in the one or more anomalous clusters; and
adjusting a configuration of the system to improve the performance of the one or more machines corresponding to the one or more anomalous groups.

2. The method of claim 1, further comprising:
receiving the performance-related data from the one or more machines in the system, prior to the forming.

3. The method of claim 1, further comprising:
comparing each group of the plurality of groups with all other groups of the plurality of groups.

4. The method of claim 3, further comprising:
generating, based on the comparing, a group of dissimilarity weights for each group of the plurality of groups prior to the clustering, each group of dissimilarity weights corresponding to dissimilarities between a corresponding group and all other groups in the plurality of groups.

5. The method of claim 1, further comprising:
comparing each group in the plurality of groups with each of the plurality of groups.

6. The method of claim 5, further comprising:
generating, based on the comparing, a group of dissimilarity weights for each group of the plurality of groups prior to the clustering, each dissimilarity weight in the group of dissimilarity weights corresponding to dissimilarities between a corresponding group and another group in the plurality of groups.

7. The method of claim 1, wherein adjusting the configuration of the system comprises adjusting a configuration of the one or more machines.

8. The method of claim 1, wherein adjusting the configuration of the system comprises changing a hardware configuration of or adding a hardware element to one or more machines in the system.

9. A non-transitory computer readable medium comprising instructions to be executed in a computer system, wherein the instructions when executed in the computer system perform a method for improving performance of one or more machines within a system, the method comprising:
forming a multidimensional dataset having a plurality of groups, each group of the plurality of groups corresponding to one of a plurality of machines within the system, the multidimensional dataset formed using performance related data associated with each of the plurality of machines;
clustering the plurality of groups into one or more clusters based on intergroup dissimilarities between the plurality of groups, the intergroup dissimilarities determined by comparing performance related data associated with each group in the plurality of groups against performance related data associated with every other group in the plurality of groups;
identifying one or more anomalous clusters from among the one or more clusters, the one or more anomalous clusters containing at least one group dissimilar to other groups in the plurality of groups;
identifying the one or more anomalous groups in the one or more anomalous clusters; and
adjusting a configuration of the system to improve the performance of the one or more machines corresponding to the one or more anomalous groups.

10. The non-transitory computer readable medium of claim 9, wherein the method further comprises:
receiving the performance-related data from the one or more machines in the system, prior to the forming.

11. The non-transitory computer readable medium of claim 9, wherein the method further comprises:
comparing each group of the plurality of groups with all other groups of the plurality of groups.

12. The non-transitory computer readable medium of claim 11, wherein the method further comprises:
generating, based on the comparing, a group of dissimilarity weights for each group of the plurality of groups prior to the clustering, each group of dissimilarity weights corresponding to dissimilarities between a corresponding group and all other groups in the plurality of groups.

13. The non-transitory computer readable medium of claim 9, wherein the method further comprises:
comparing each group in the plurality of groups with each of the plurality of groups.

14. The non-transitory computer readable medium of claim 13, wherein the method further comprises:
generating, based on the comparing, a group of dissimilarity weights for each group of the plurality of groups prior to the clustering, each dissimilarity weight in the group of dissimilarity weights corresponding to dissimilarities between a corresponding group and another group in the plurality of groups.

15. The non-transitory computer readable medium of claim 9, wherein adjusting the configuration of the system comprises adjusting a configuration of the one or more machines.

16. The non-transitory computer readable medium of claim 9, wherein adjusting the configuration of the system comprises changing a hardware configuration of or adding a hardware element to one or more machines in the system.

17. A computer system comprising:
a memory; and
a processor communicatively coupled to the memory, wherein the processor is configured to:
form a multidimensional dataset having a plurality of groups, each group of the plurality of groups corresponding to one of a plurality of machines within the system, the multidimensional dataset formed using performance related data associated with each of the plurality of machines;
cluster the plurality of groups into one or more clusters based on intergroup dissimilarities between the plurality of groups, the intergroup dissimilarities determined by comparing performance related data associated with each group in the plurality of groups against performance related data associated with every other group in the plurality of groups;

identify one or more anomalous clusters from among the one or more clusters, the one or more anomalous clusters containing at least one group dissimilar to other groups in the plurality of groups;

identify the one or more anomalous groups in the one or more anomalous clusters; and adjust a configuration of the system to improve the performance of the one or more machines corresponding to the one or more anomalous groups.

18. The computer system of claim 17, wherein the processor is further configured to:

receive the performance-related data from the one or more machines in the system, prior to the forming.

19. The computer system of claim 17, wherein the processor is further configured to:

compare each group of the plurality of groups with all other groups of the plurality of groups.

20. The computer system of claim 19, wherein the processor is further configured to:

generate, based on the comparison, a group of dissimilarity weights for each group of the plurality of groups prior to the clustering, each group of dissimilarity weights corresponding to dissimilarities between a corresponding group and all other groups in the plurality of groups.

21. The computer system of claim 17, wherein the processor is further configured to:

compare each group in the plurality of groups with each of the plurality of groups.

22. The computer system of claim 21, wherein the processor is further configured to:

generate, based on the comparison, a group of dissimilarity weights for each group of the plurality of groups prior to the clustering, each dissimilarity weight in the group of dissimilarity weights corresponding to dissimilarities between a corresponding group and another group in the plurality of groups.

23. The computer system of claim 17, wherein the processor, being configured to adjust the configuration of the system, is further configured to adjust a configuration of the one or more machines.

24. The computer system of claim 17, wherein the processor, being configured to adjust the configuration of the system, is further configured to change a hardware configuration of or add a hardware element to one or more machines in the system.

* * * * *